(12) United States Patent
Allen et al.

(10) Patent No.: US 8,802,051 B2
(45) Date of Patent: Aug. 12, 2014

(54) PROCESS FOR PRODUCTION OF A METAL HYDRIDE

(75) Inventors: Nathan Tait Allen, Philadelphia, PA (US); Robert Butterick, III, Swedesboro, NJ (US); Arthur Achhing Chin, Cherry Hill, NJ (US); Dean Michael Millar, Midland, MI (US); David Craig Molzahn, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 786 days.

(21) Appl. No.: 13/053,350

(22) Filed: Mar. 22, 2011

(65) Prior Publication Data

US 2011/0236300 A1 Sep. 29, 2011

Related U.S. Application Data

(60) Provisional application No. 61/317,953, filed on Mar. 26, 2010.

(51) Int. Cl.
*C01B 6/04* (2006.01)

(52) U.S. Cl.
CPC .............................. *C01B 6/04* (2013.01)
USPC ............................ 423/645; 423/646; 423/647

(58) Field of Classification Search
CPC .......................................................... C01B 6/04
USPC .......................................... 423/646, 645, 647
See application file for complete search history.

(56) References Cited

U.S. PATENT DOCUMENTS

| | | | |
|---|---|---|---|
| 2,898,195 A | 8/1959 | Banus | |
| 3,184,492 A | 5/1965 | Marc | |
| 3,257,455 A | 6/1966 | Ashby | |
| 3,290,393 A | 12/1966 | Marchand | |
| 3,394,158 A * | 7/1968 | Chini et al. | 556/181 |
| 3,507,895 A | 4/1970 | Bohuslav | |
| 3,617,218 A * | 11/1971 | Van Tamelen et al. | 423/646 |
| 3,728,272 A | 4/1973 | Casensky | |
| 4,327,071 A | 4/1982 | Chiu et al. | |
| 4,957,727 A | 9/1990 | Bogdanovic | |
| 7,247,286 B2 | 7/2007 | Ashby | |
| 2004/0258613 A1 | 12/2004 | Heller et al. | |

FOREIGN PATENT DOCUMENTS

| | | |
|---|---|---|
| EP | 0090926 | 10/1983 |
| EP | 327473 | 9/1989 |
| JP | 4292401 | 10/1992 |

* cited by examiner

*Primary Examiner* — Stanley Silverman
*Assistant Examiner* — Syed Iqbal
(74) *Attorney, Agent, or Firm* — Kenneth Crimaldi

(57) ABSTRACT

A process for production of a metal hydride compound $MH_x$, wherein x is one or two and M is an alkali metal, Be or Mg. The process comprises combining a compound of formula $(R^1O)_xM$ with aluminum, hydrogen and at least one metal selected from among titanium, zirconium, hafnium, niobium, vanadium, tantalum and iron to produce a compound of formula $MH_x$. $R^1$ is phenyl or phenyl substituted by at least one alkyl or alkoxy group. A mole ratio of aluminum to $(R^1O)_xM$ is from 0.1:1 to 1:1. The catalyst is present at a level of at least 200 ppm based on weight of aluminum.

6 Claims, No Drawings

PROCESS FOR PRODUCTION OF A METAL HYDRIDE

This application claims the benefit of priority under 35 U.S.C. §119(e) of U.S. Provisional Patent Application No. 61/317,953 filed on Mar. 26, 2010.

This invention was made with Government support under Contract No. DE-FC36-05GO15053 awarded by the Department of Energy. The Government has certain rights in this invention.

BACKGROUND

This invention relates generally to a process for production of a metal hydride.

Production of sodium hydride from metallic sodium and hydrogen is well known in the art, as described, e.g., in U.S. Pat. No. 2,898,195. However, sodium is expensive and difficult to handle.

The problem addressed by this invention is to find an efficient and economical process for production of a metal hydride compound.

STATEMENT OF INVENTION

The present invention is directed to a process for production of a metal hydride compound $MH_x$, wherein x is one or two and M is an alkali metal, Be or Mg. The process comprises combining a compound of formula $(R^1O)_xM$ with aluminum, hydrogen and a metallic catalyst comprising at least one metal selected from the group consisting of titanium, zirconium, hafnium, niobium, vanadium, tantalum and iron to produce a compound of formula $MH_x$; wherein $R^1$ is phenyl or phenyl substituted by at least one alkyl or alkoxy group; a mole ratio of aluminum to $(R^1O)_xM$ is from 0.1:1 to 1:1; and wherein the catalyst is present at a level of at least 200 ppm based on weight of aluminum.

The present invention is further directed to a process for production of a metal hydride compound $MH_x$, wherein x is one or two and M is an alkali metal, Be or Mg; said process comprising combining a compound of formula $(R^1O)_xM$ with an aluminum hydride species; wherein $R^1$ is phenyl or phenyl substituted by at least one alkyl or alkoxy group.

DETAILED DESCRIPTION

All percentages are weight percentages ("wt %") and temperatures are in °C., unless specified otherwise. An "alkyl" group is a saturated hydrocarbyl group having from one to twelve carbon atoms in a linear, branched or cyclic arrangement. Preferably, alkyl groups are acyclic; alternatively $C_1$-$C_6$ acyclic. An "aryl" group is an aromatic hydrocarbyl group having from six to ten carbon atoms, and optionally, alkyl and/or alkoxy substituents. An "aralkyl" group is an alkyl group substituted by an aryl group, e.g., a benzyl group. A "metal hydride compound" is a compound of formula $MH_x$, wherein x is one or two, depending on the valence of M, and M is an alkali metal, Be or Mg.

Preferably, M is an alkali metal and x is one; preferably the alkali metal is lithium, sodium or potassium; preferably sodium or potassium; preferably sodium.

Preferably, $R^1$ is phenyl or phenyl substituted by at least one of: (i) an alkoxy group having from one to six carbon atoms; and (ii) an alkyl group having from three to six carbon atoms. Preferably, $R^1$ is phenyl or phenyl substituted by at least one of: (i) an alkoxy group having from one to four carbon atoms; and (ii) an alkyl group having from three to four carbon atoms. Preferably, $R^1$ is not phenyl or phenyl substituted by methyl. Preferably, $R^1$ is phenyl substituted by at least one of: (i) an alkoxy group having from one to four carbon atoms; and (ii) an alkyl group having from three to four carbon atoms. Preferably, $R^1$ is phenyl substituted by an alkoxy group having from one to four carbon atoms, preferably methoxy or ethoxy, preferably methoxy. Preferably, $R^1$ is 4-methoxyphenyl; 2-methoxyphenyl; 3-methoxyphenyl; 4-ethoxyphenyl; 2-ethoxyphenyl; 3-ethoxyphenyl; 4-isopropylphenyl; 2-isopropylphenyl; 3-isopropylphenyl; 2,6-di-t-butyl-4-methylphenyl; 2,6-di-t-butyl-4-methoxyphenyl; 2,6-di-t-butyl-4-ethylphenyl; 2,4-di-t-butylphenyl; 2,5-di-t-butyl-4-methoxyphenyl; or 2,6-di-isopropylphenyl. Preferably, $R^1$ is 4-methoxyphenyl; 2,6-di-t-butyl-4-methylphenyl; or 2,6-di-t-butyl-4-methoxyphenyl; preferably 4-methoxyphenyl.

Preferably, the mole ratio of aluminum to $R^1OM$ is at least 0.2:1, preferably at least 0.25:1; preferably the ratio is no greater than 0.9:1, preferably no greater than 0.7:1, preferably no greater than 0.5:1, preferably no greater than 0.4:1, preferably no greater than 0.3:1.

The reaction of a compound of formula $(R^1O)_xM$ with aluminum, hydrogen and a metallic catalyst is illustrated in the following equation, in which $R^1$ is 4-methoxyphenyl, M is sodium, the metallic catalyst is titanium and the aluminum: $R^1ONa$ ratio is 0.25:1.

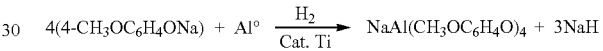

$$4(4\text{-}CH_3OC_6H_4ONa) + Al^\circ \xrightarrow[\text{Cat. Ti}]{H_2} NaAl(CH_3OC_6H_4O)_4 + 3NaH$$

Preferably, the metal hydride precipitates from the reaction solution and can be separated easily, while the aryl oxide species are soluble and remain in solution.

Preferably, the metallic catalyst comprises titanium, zirconium, hafnium or combinations thereof; preferably titanium. Preferably, the metallic catalyst is incorporated into the aluminum at a level of at least 240 ppm based on weight of aluminum, preferably at least 280 ppm, preferably at least 300 ppm, preferably at least 320 ppm, preferably at least 340 ppm. Preferably, the metallic catalyst is incorporated into the aluminum at a level no greater than 10,000 ppm based on weight of aluminum, preferably no greater than 5,000 ppm. Preferably, the metallic catalyst may be added as a compound of the metal at the same levels stated above. When the metallic catalyst is titanium, it may be added as an alloy in the aluminum, as a compound of titanium such as titanium(IV)isopropoxide or titanium(IV)chloride or as free titanium metal. Preferably, the aluminum has an average particle size from 50 to 1000 microns, preferably from 75 to 700 microns. Preferably, the reaction of a compound of formula $(R^1O)_xM$, wherein M is an alkali metal, Be or Mg, with aluminum, hydrogen and a metallic catalyst proceeds under an absolute pressure of at least 100 psi (0.7 MPa), preferably at least 200 psi (1.4 MPa), preferably at least 300 psi (2 MPa), preferably at least 500 psi (3.4 MPa). Preferably, the reaction proceeds at a pressure no greater than 1500 psi (10.3 MPa), preferably no greater than 1200 psi (8.3 MPa), preferably no greater than 1000 psi (6.9 MPa). Preferably, the reaction proceeds at a temperature of at least 40° C., preferably at least 80° C., preferably at least 100° C., preferably at least 120° C. Preferably, the reaction proceeds at a temperature no greater than 200° C., preferably no greater than 180° C., preferably no greater than 160° C., preferably no greater than 140° C.

Preferably, the reaction of $(R^1O)_xM$ with aluminum and hydrogen in the presence of a metallic catalyst proceeds in a solvent. Solvents suitable for the reaction of $(R^1O)_xM$ with aluminum and hydrogen in the presence of a metallic catalyst include ethers, e.g., diglyme, tetraglyme, diethyl ether, dibutyl ether, dibutyl diglyme, tetrahydrofuran, dimethoxyethane, and 2-methyltetrahydrofuran; and aromatic solvents, e.g., benzene, toluene and xylenes. The concentration is not critical, although it is preferred that the $(R^1O)_xM$ is dissolved completely in the solvent.

In some preferred embodiments, the compound $MH_x$ is combined with hydrogen and aluminum to produce an alkali metal aluminum hydride, $MAlH_4$, which may be allowed to react with a borate, boroxine or borazine compound to form $MBH_4$. Preferably, the borate or boroxine compound is a boroxine having formula $B(OR^2)_3$ or $(R^2OBO)_3$, wherein $R^2$ is aryl or aralkyl; preferably a boroxine where $R^2$ is aryl. Preferably, $R^2$ is aryl. Preferably, $R^2$ is the same as $R^1$. Preferably, this reaction proceeds at a temperature in the range from 0° C. to 50° C., preferably from 10° C. to 35° C. Preferably, the metal borohydride precipitates from the reaction solvent and is separated, while the aryloxide salts remain in solution.

Preferred solvents for the reaction of $(R^1O)_xM$ with aluminum and hydrogen in the presence of a metallic catalyst are those in which the metal hydride has limited solubility, e.g., ethers, including 2-methyl-tetrahydrofuran, tetrahydrofuran, dimethoxyethane, diglyme, triglyme, tetraglyme, diethyl ether, dibutyl ether and dibutyl diglyme; aromatic solvents; and alkanes. Especially preferred solvents include 2-methyl-tetrahydrofuran, tetrahydrofuran and dimethoxyethane.

The aluminum-containing products formed along with the metal hydride may be complex and may be accompanied by alkali metal aryloxides. Preferably, the aryl oxide species containing alkali metal and/or aluminum which are formed along with the alkali metal hydride are separated from the metal hydride and treated with water or an aqueous acid, preferably a mineral acid, to regenerate the phenol or substituted phenol, $R^1OH$ for recycling. Preferred aqueous acids include sulfuric acid and hydrochloric acid. The recovered phenol may be recycled. A phenol or substituted phenol may be combined with boric acid (or meta-boric acid or boron oxide) or a trialkyl borate to form a triaryl borate, $(ArO)_3B$, or triaryl boroxine, $(ArOBO)_3$, depending on the stoichiometry and temperature of the reaction; higher temperatures and 1:1 stoichiometry between the boron compound and the alcohol or phenol favor the boroxine. Preferably, the reaction temperature is from 100° C. to 300° C., preferably from 110° C. to 250° C., preferably from 110° C. to 200° C., The reaction to form the boroxine is illustrated below for the case where the substituted phenol is 4-methoxyphenol, which reacts with boric acid

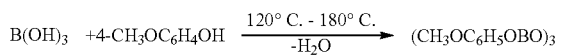

Borazines may be generated from the reaction of phenols having an ortho-amino substituent with boric acid or trialkyl borates.

The reaction may also be run without a solvent, e.g., as a slurry process or by grinding the solid reactants. Grinding of the reactants will accelerate the reaction, and may be achieved using any method which applies energy to solid particles to induce a mechanochemical reaction, especially any method which reduces solids to the micron size range, preferably the sub-micron size range, and continually exposes fresh surfaces for reaction, e.g., impact, jet or attrition milling. Preferred methods include ball milling, vibratory (including ultrasonic) milling, air classifying milling, universal/pin milling, jet (including spiral and fluidized jet) milling, rotor milling, pearl milling. Especially preferred methods are planetary ball milling, centrifugal ball milling, and similar types of high kinetic energy rotary ball milling. Preferably, milling is performed in either a hydrogen atmosphere, or an inert atmosphere, e.g., nitrogen. In an embodiment in which a solvent is used, grinding of the reactants may be achieved using any method suitable for grinding a slurry. A solvent facilitates heat transfer, thereby minimizing hot spots and allowing better temperature control. Recycle of the solvent is possible to improve process economics. Examples of solvents suitable for use during the process include amines, especially tertiary amines; alkanes and cycloalkanes, especially $C_8$-$C_{12}$ alkanes and cycloalkanes; ionic liquids; liquid crown ethers; and for lower-temperature reaction conditions, toluene, glymes and ethers. Suitable reaction solvents are those in which the borohydride compound is soluble and which are relatively unreactive with borohydride.

Another method to accelerate the reaction is to use radiation techniques alone or in combination with reactive milling. For example, microwave irradiation can direct energy at specific reaction surfaces to provide rapid heating and deep energy penetration of the reactants. Microwave absorbers such as metal powders, which could be used as milling media, and dipolar organic liquids may also be added to the reaction system to promote the reaction. The advantage of these techniques is that high reaction rates may occur at considerably lower processing temperature than could be obtained with resistive heating thermal techniques.

An "aluminum hydride species" is a species having aluminum bonded directly to at least one hydrogen atom. Examples of such species include $M(AlH_4)_x$, $M(AlH_3OR^1)_x$, wherein M is an alkali metal, Be or Mg; x is one or two; and $R^1$ is phenyl or phenyl substituted by at least one of: (i) an alkoxy group having from one to six carbon atoms; and (ii) an alkyl group having from three to twelve carbon atom; and $AlH_3$. $M(AlH_3OR^1)_x$ may contain varying amounts of other related species having the formula $M(AlH_{4-x}(OR^1)_y)_x$, where y is an integer from zero to four, including varying amounts of $M(AlH_4)_x$. When a compound of formula $(R^1O)_xM$ is combined with an aluminum hydride species to generate $MH_x$, the molar ratio of aluminum to all $R^1O$ groups present, both in $(R^1O)_xM$ and in $M(AlH_{4-x}(OR^1)_y)_x$, preferably is at least 0.2:1, preferably at least 0.25:1; preferably the ratio is no greater than 0.9:1, preferably no greater than 0.7:1, preferably no greater than 0.5:1, preferably no greater than 0.4:1, preferably no greater than 0.3:1.

EXAMPLES

Example 1

Molar Ratio Al/Na=0.34; 165° C./950 psig

In a nitrogen filled glove box, a 300 ml PARR pressure vessel was loaded with aluminum (1.258 g, ECKA, lot #035386, containing 0.185 wt % Ti), sodium p-methoxy phenolate (20.0 g, anhydrous) and 80 g of tetrahydrofuran. The reactor was sealed and transferred from the glove box, installed into the reactor stand, and pressurized to 600 psig (4.1 MPa) with hydrogen, then heated to 165° C. At 165° C. the reactor pressure was adjusted to 950 psig (6.7 MPa). The pressure was maintained for the remainder of the heating time. The reaction was maintained at temperature for about 300 minutes. After cooling to room temperature, the hydrogen was vented and the reactor was moved back into the glove box. The reaction product was filtered and 1.95 g of solid was obtained (59% yield NaH based on NaOAr used). Soluble aluminum hydrides were detected at 4.1 weight percent (equivalent to 18.8% yield based on NaMEHQ). The isolated solid was characterized as NaH (powder x-ray diffraction and hydrolysis data).

Example 2 (Comparative)

Molar Ratio Al/Na=1.23; 160° C./350 psig

In a nitrogen filled glove box, a 300 ml PARR pressure vessel was loaded with aluminum (5.4 g, ECKA, lot #035386, containing 0.185 wt % Ti, pre-activated), sodium p-methoxy phenolate (23.7 g, anhydrous) and tetrahydrofuran (114.8 g). The solution was treated with 1.2 g of sodium trihydridoaluminum-(4-methoxy)phenoxide (STAMP) solution (24 weight percent STAMP) to ensure no active H was present. The reactor was sealed, transferred from the glove box, installed into the reactor stand, and pressurized to 250 psig (1.7 MPa) with hydrogen, then heated to 160° C. At 160° C. the reactor pressure was adjusted to 350 psig (2.4 MPa). The pressure was maintained for the remainder of the heating time. The reaction was maintained at temperature for about 120 minutes. After cooling to room temperature, the hydrogen was vented and the reactor was moved back into the glove box. The reaction product was filtered and 3.99 g of solid was obtained (mixture of Al and NaH by x-ray analysis). Soluble aluminum hydrides expressed as STAMP were 16.3 weight percent, which is equivalent to 61.3% yield based on NaMEHQ). From the solid mass balance the NaH yield based on NaMEHQ was only 29.5%.

Example 3

Sodium Hydride from an Aluminum Hydride

In the glove box, transferred 80.00 g of a 20.0 weight percent solution of sodium p-methoxyphenolate in tetrahydrofuran into a plastic container with a top. Added 31.42 g of a STAMP reaction product containing an 0.109 equivalents of hydride (0.0363 molar STAMP) and closed the container. Stirred reaction at room temperature for two hours. Filtered product and obtained a white solid that was vacuum dried to a final weight of 2.495 g Preparation of tris(4-methoxyphenoxy)-boroxine To a 250 mL stirred, two-neck round bottom flask, 61.83 g (1.0 mol) of ortho-boric acid and 130.3 g (1.05 mol) 4-methoxyphenol were added. The flask was fitted with a short path distillation column on one neck and a thermocouple and inert gas needle on the other. The reactor was flushed with nitrogen and the temperature was raised to 120° C., at which time water was generated. After 1 hour, the temperature was raised to 160° C. and held for another hour. After water was no longer observed, the temperature was set to 180° C. A vacuum was then applied to remove the excess 4-methoxyphenol, leaving tris(4-methoxyphenoxy)-boroxine (149 g (0.33 mol)).

The invention claimed is:

1. A process for production of a metal hydride compound $MH_x$, wherein x is one or two and M is an alkali metal, Be or Mg; said process comprising combining a compound of formula $(R^1O)_xM$ with aluminum, hydrogen and titanium, wherein the titanium is present as an alloy in the aluminum or as free titanium metal, to produce a compound of formula $MH_x$; wherein $R^1$ is phenyl or phenyl substituted by at least one alkyl or alkoxy group; a mole ratio of aluminum to $(R^1O)_xM$ is from 0.1:1 to 1:1; and wherein the titanium is present at a level of at least 200 ppm based on weight of aluminum.

2. The process of claim 1 in which M is lithium, sodium or potassium, and x is one.

3. The process of claim 2 in which the mole ratio of aluminum to $R^1OM$ is from 0.1:1 to 0.7:1.

4. The process of claim 3 in which $R^1$ is phenyl substituted by an alkoxy group having from one to four carbon atoms.

5. The process of claim 4 in which M is sodium and $R^1$ is 4-methoxyphenyl.

6. The process of claim 5 in which the mole ratio of aluminum to $R^1ONa$ is from 0.2:1 to 0.5:1.

* * * * *